United States Patent
Mutti et al.

(10) Patent No.: US 12,503,887 B2
(45) Date of Patent: Dec. 23, 2025

(54) ELECTRONICALLY CONTROLLED DOOR LATCH

(71) Applicant: Kiekert AG, Heiligenhaus (DE)

(72) Inventors: Carlo Mutti, Origlio (CH); Marco Merletti, Gazzada Schianno (IT)

(73) Assignee: Kiekert AG, Heiligenhaus (DE)

( * ) Notice: Subject to any disclaimer, the term of this patent is extended or adjusted under 35 U.S.C. 154(b) by 156 days.

(21) Appl. No.: 18/497,391

(22) Filed: Oct. 30, 2023

(65) Prior Publication Data
US 2024/0151074 A1 May 9, 2024

(30) Foreign Application Priority Data
Nov. 3, 2022 (EP) .................................... 22205295

(51) Int. Cl.
*E05B 81/56* (2014.01)
*B60R 16/03* (2006.01)
*E05B 81/04* (2014.01)
*E05B 81/82* (2014.01)

(52) U.S. Cl.
CPC .............. *E05B 81/56* (2013.01); *B60R 16/03* (2013.01); *E05B 81/04* (2013.01); *E05B 81/82* (2013.01)

(58) Field of Classification Search
CPC .......... E05B 81/56; E05B 81/04; E05B 81/82; B60R 16/03
See application file for complete search history.

(56) References Cited

U.S. PATENT DOCUMENTS

| | | | | |
|---|---|---|---|---|
| 3,611,287 | A * | 10/1971 | Hoff | B60R 25/04 180/289 |
| 11,649,652 | B2 * | 5/2023 | Crandall | A01D 34/008 49/29 |
| 2016/0288744 | A1 * | 10/2016 | Rutherford | H04W 88/10 |

(Continued)

FOREIGN PATENT DOCUMENTS

| | | |
|---|---|---|
| CN | 114363099 A | 4/2022 |
| EP | 3722137 A1 | 10/2020 |

(Continued)

*Primary Examiner* — Mark A Williams
(74) *Attorney, Agent, or Firm* — Renner, Otto, Boisselle & Sklar, LLP

(57) ABSTRACT

An electronically controlled door latch for a motor vehicle, the electronically controlled door latch being configured for operating in at least three different operation conditions including a normal operating condition, a sleep operating condition and a crash operating condition, and comprising a system basis chip configured for receiving a main supply voltage from a main power source of the motor vehicle during the normal operating condition and a backup supply voltage during the crash operating condition, an electric motor configured for actuating the electronically controlled door latch based on the main supply voltage (Vbatt) during the normal operating condition and on the backup supply voltage during the crash operating condition, and an electronic control unit configured, when being triggered by the system basis chip, for falling asleep during the sleep operating condition and for being wakening up during the normal operating condition and the crash operating condition and configured for controlling the electric motor during the normal operating condition and during the crash operating condition.

10 Claims, 1 Drawing Sheet

(56) References Cited

U.S. PATENT DOCUMENTS

| | | | | |
|---|---|---|---|---|
| 2017/0107747 A1* | 4/2017 | Dente | ................. | E05B 81/86 |
| 2018/0086293 A1* | 3/2018 | Zhang | ................. | B60R 16/03 |
| 2020/0252868 A1 | 8/2020 | Jiang | | |
| 2020/0377055 A1* | 12/2020 | Ando | ............... | B60W 50/0098 |
| 2022/0205309 A1* | 6/2022 | Castonguay | ........... | E05F 15/74 |
| 2023/0112684 A1* | 4/2023 | Cetnar | ................ | E05B 81/06 |
| | | | | 70/278.7 |
| 2023/0303019 A1* | 9/2023 | Yuzawa | ............... | B60R 16/03 |

FOREIGN PATENT DOCUMENTS

| | | |
|---|---|---|
| KR | 20200080983 A | 7/2020 |
| WO | 2005047628 A1 | 5/2005 |
| WO | 2014102279 A1 | 7/2014 |

* cited by examiner

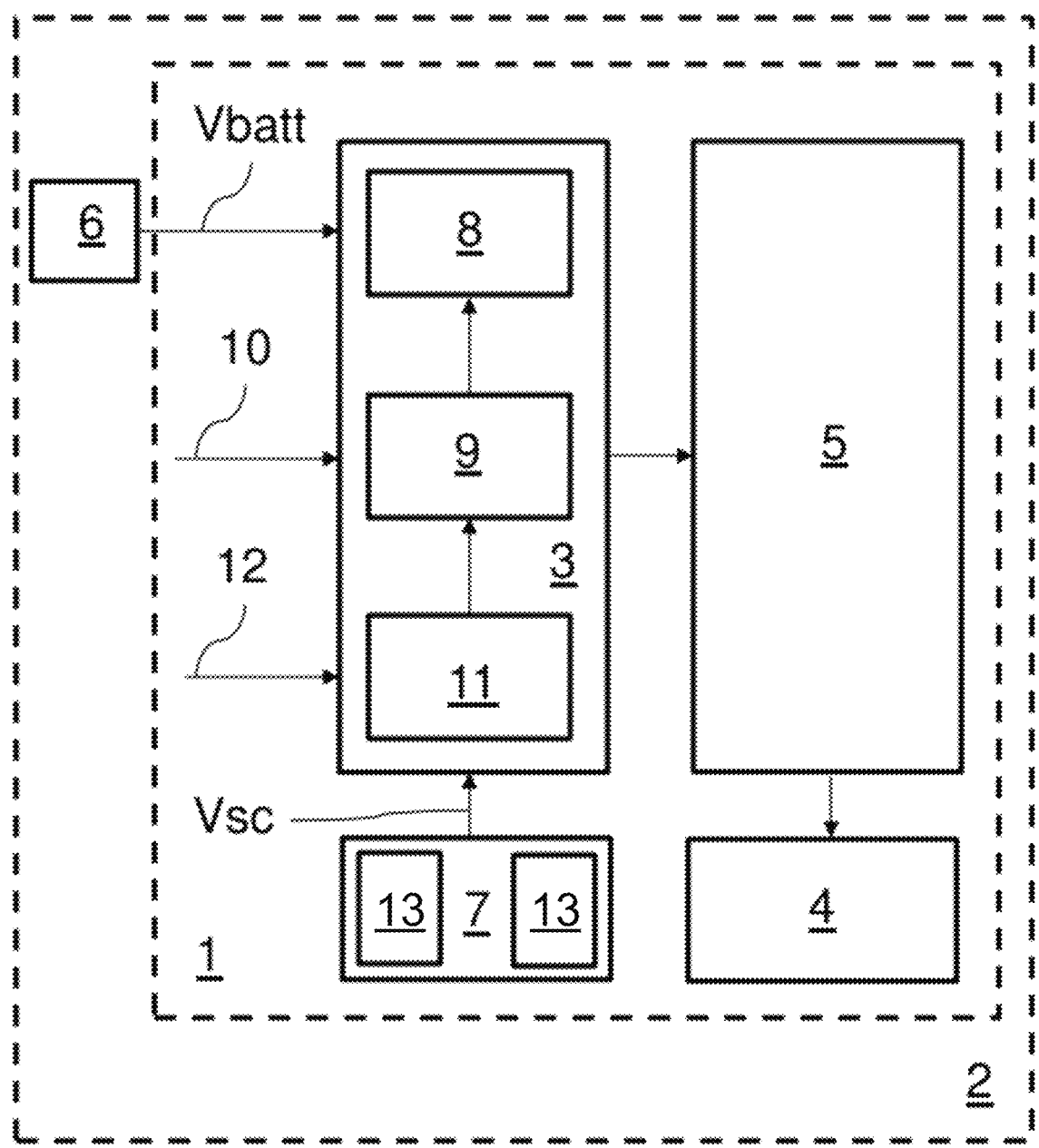

ELECTRONICALLY CONTROLLED DOOR LATCH

This application claims priority to European Patent Application No. 22205295.3, filed Nov. 3, 2022, which is hereby incorporated herein by reference in its entirety.

TECHNICAL FIELD

The invention relates to an electronically controlled door latch for a motor vehicle, the electronically controlled door latch being configured for operating in at least two different operation conditions including a normal operating condition and a crash operating condition, and comprising an electric motor configured for actuating the electronically controlled door latch based on a main supply voltage during the normal operating condition and on a backup supply voltage during the crash operating condition. The invention further relates to a motor vehicle comprising an electronically controlled door latch and a main power source. The invention even further relates to a method for operating an electronically controlled door latch of a motor vehicle, the electronically controlled door latch being configured for operating in at least two different operation conditions including a normal operating condition and a crash operating condition, and the electronically controlled door latch comprising an electric motor configured for actuating the electronically controlled door latch based on a main supply voltage during the normal operating condition and on a backup supply voltage during the crash operating condition.

BACKGROUND ART

Several automotive systems require the presence in a vehicle of a backup energy source, to provide electrical energy in substitution, or as an aid to a main power supply of the vehicle, in case of failure or interruption of the same main power supply. Such backup power source is usually kept in a charged state during normal operation, by the main power supply of the vehicle, so as to be readily available as soon as the need arises, for example in case of an accident or crash of the vehicle.

Electronically controlled door latches usually comprise different operating conditions respectively modes, such as a normal operation condition and a crash operating condition. The crash operating condition is very critical because it is supposing that the main power supply of the vehicle is no more available. Thus, the electronically controlled door latch is required operate in the crash operating condition for several time, usually a few days. In said crash operating condition, current consumption and energy management becomes very critical.

Electronically controlled door latches usually have inner energy storage cells, such as supercaps. Energy of said inner energy storage cells usually last a few hours if fully operating all the time, which is often insufficient for the required operating time of a few days.

SUMMARY OF INVENTION

It is therefore an object of the invention to provide an electronically controlled door latch being able to operate in a crash operating condition for several time, such as a few days.

The object of the invention is solved by the features of the independent claims. Preferred implementations are detailed in the dependent claims.

Thus, the object is solved by an electronically controlled door latch for a motor vehicle, the electronically controlled door latch being configured for operating in at least three different operation conditions including a normal operating condition, a sleep operating condition and a crash operating condition, and comprising
  a system basis chip configured for receiving a main supply voltage from a main power source of the motor vehicle during the normal operating condition and a backup supply voltage during the crash operating condition,
  an electric motor configured for actuating the electronically controlled door latch based on the main supply voltage during the normal operating condition and on the backup supply voltage during the crash operating condition, and
  an electronic control unit configured, when being triggered by the system basis chip, for falling asleep during the sleep operating condition and for being wakening up during the normal operating condition and the crash operating condition and configured for controlling the electric motor during the normal operating condition and during the crash operating condition.

A key point of the proposed solution lies in adopting a sleep strategy in which at least the electronic control unit enters a low power consumption status, while only monitoring only a few wakeup sources such as the system basis chip for awaking to perform required operation. Thus, by using a system basis chip overall power consumption of the electronically controlled door latch is significantly reduced compared to electronically controlled door latches not having such system basis chip. During the sleep condition the electronic control unit is preferably nearly completely switched off, which means that only functionality for wakening up the electronic control unit is still operating, thereby greatly reducing overall power consumption of the electronic control unit.

The system basic chip is preferably provided as an integrated circuit that includes various functions of automotive electronic control units, ECU, on a single die. The system basic chip may include embedded functions such as voltage regulators, supervision functions, reset generators, watchdog functions, bus interfaces, such as a for example Local Interconnect Network (LIN), CAN bus or others, wake-up logic and/or power switches. The electronic control unit is preferably configured to enter different operating states, such as falling asleep or awoken, in response to a trigger signal received from the system basis chip based on the respective operating condition, such as the sleep operating condition, the normal operating condition or the crash operating condition.

The crash or failure operating condition occurs in case of failure of the main power supply of the vehicle, or in case of interruptions or breaking of an electrical connection between the main power supply and vehicle doors operated by the electronically controlled door latch, for example in case of an accident or crash involving the vehicle. In contrast thereto the normal or regular operating condition should be understood as a mode in which the main power supply provides the electrical energy for operating the electric motor.

The main power source is preferably provided as a battery of the motor vehicle for example delivering 12 or 24 V DC. During the normal operating condition the main power source may charge a supercapacitor group described below providing the backup supply voltage. The motor vehicle and/or the electronically controlled door latch may in this respect comprise a charge module, in particular controllable by the control, for recharging the supercapacitor group, starting from the main supply voltage, whenever power from the main supply voltage is available. The electric motor is preferably configured for actuating the electronically controlled door latch in respect to locking and unlocking a door of the motor vehicle.

More generally, the expression "electronically controlled door latch" should be understood as a means for locking a movable element between an open position and a closed position, thereby opening and closing an access to an inner compartment of a motor vehicle, for example including, boot, rear hatches, bonnet lid or other closed compartments, window regulators, sunroofs, in addition to the side doors of a motor vehicle. The proposed electronically controlled door latch allows for complying with security and safety regulations requiring opening for example of the vehicle doors, even in case of failure of the main power supply of the vehicle, or in case of interruptions or breaking of the electrical connection between the main power supply and the vehicle doors. Such kind of situation may occur, for example, in case of an accident or crash involving the vehicle.

The vehicle can be provided as an electrical vehicle. The electronically controlled door latch may comprise a housing, made of metal, plastics or a combination thereof. The supercapacitor group described below, the electric motor, the system basis chip and the electronic control unit are preferably provided within the housing.

The electronically controlled door latch may comprise a four-quadrant controller, which is applied by the control unit configured with a pulse width modulated signal. Pulse width modulating the four-quadrant controller means preferably that the four-quadrant controller is switched based on pulse width modulated signals. Pulse-width modulation, PWM, or pulse-duration modulation, PDM, is generally understood as a method of reducing an average power delivered by an electrical signal, by effectively chopping the signal up into discrete parts. Particularly, the electric motor can be operated based on such PWM signal by switching the backup supply voltage and/or the main supply voltage on and off. By varying the pulse width of the PWM signal, the speed of the electric motor can be controlled.

The four-quadrant controller can be provided as H-bridge and/or comprise switches provided as MOSFETs. Generally, a H-bridge is an electronic circuit that switches the polarity of a voltage applied to a load, here the main supply voltage and/or the backup supply voltage as voltage and the electric motor as load. By means of such H-bridge the electric motor can be run forwards or backwards, for example for locking or unlocking the door of the motor vehicle. The name is derived from its common schematic diagram representation, with four switches configured as branches of a letter "H" and a load i.e. the electric motor connected as the cross-bar. A solid-state H-bridge is typically constructed using opposite polarity switches, such as PNP bipolar junction transistors or p-channel MOSFETs connected to the main power source and n-channel MOSFETs connected to ground. Alternatively, p-channel or n-channel MOSFETs can be used on both sides.

The control unit can be provided as a microprocessor, microcontroller or analogous computing module, configured to control operation of the electric motor in particular via the four-quadrant controller, in particular also based on a value of the main voltage and/or of the backup supply voltage. Besides that the control unit may be configured for connecting to other controllers of the motor vehicle, such for example a control device of the motor vehicle.

The control unit and/or the system basic chip can be further configured for determining if the value of the main voltage decreases below a predetermined threshold value so as to determine that a crash operating condition is occurring. In this respect the electronic control unit may comprise an embedded memory, for example a non-volatile random access memory, coupled to a computing module, storing suitable programs and computer instructions, for example in the form of a firmware. The control unit may alternatively comprise a logical circuit of discrete components to carry out the functions of the computing module and memory.

According to a preferred implementation the system basis chip comprises a low-dropout, LDO, regulator configured for receiving the main supply voltage and the backup supply voltage, a wakeup manager configured for receiving a wakening up signal and a bus transceiver configured for communicating with the motor vehicle. The low-dropout regulator is preferably provided as a DC linear voltage regulator that can regulate an output voltage even when a supply voltage i.e. the main supply voltage or the auxiliary supply voltage is very close to the output voltage. The LDO may comprise a power FET and a differential amplifier. The wakeup manager is preferably configured for processing the wakening up signal in respect to wakening up the electronic control unit and/or falling asleep the electronic control unit. The bus transceiver is preferably configured for exchanging information with a Local Interconnect Network (LIN), CAN bus or other networks.

In another preferred implementation the system basic chip is configured, during the sleep operating condition, to powering off the LDO regulator and/or the bus transceiver. By powering off the LDO regulator and/or the bus transceiver maximum power saving of the electronically controlled door latch can be achieved during the sleep operating condition. In such case only the wakeup manager is not shut down for listening if a wakeup condition occurs through such wise wakening up the system basic chip and preferably subsequently the electronic control unit.

According to a further preferred implementation the system basis chip comprises a low-dropout, LDO, regulator and/or a wakeup manager configured for wakening up the electronic control unit in response to a wakening up signal. In another preferred implementation the electronic control unit is configured for processing a wakening up request associated to the wakening up signal. Thus, the system basic chip, the LDO regulator and/or the wakeup manager may act as a 'buffer' when the wakening up signal has been received for subsequently instructing the electronic control unit once being woken up to process the wakening up request associated to the wakening up signal.

According to a further preferred implementation the system basis chip is configured to wakening up the electronic control unit in response to an i/o status signal change, a bus transition and/or a change from the normal operating condition to the crash operating condition. The bus transition may be triggered by signal received by the bus transceiver.

In another preferred implementation the electronically controlled door latch comprises a supercapacitor group configured to store energy during the normal operating condition and to provide the backup supply voltage during the crash operating condition. According to a further preferred implementation the supercapacitor group comprises at least a first supercapacitor cell, preferably at least a first and a second supercapacitor cells, connected to each other, to jointly provide the backup supply voltage.

A supercapacitor cell, also referred to as supercapacitor, supercap, SC, or called an ultracapacitor, is typically a high-capacity capacitor with a capacitance value much higher than other capacitors, but with lower voltage limits, that bridges the gap between electrolytic capacitors and rechargeable batteries. The supercapacitor typically stores 10 to 100 times more energy per unit volume or mass than electrolytic capacitors, can accept and deliver charge much faster than batteries, and tolerates many more charge and discharge cycles than rechargeable batteries.

The supercapacitor cell comprises, when fully charged, for example the voltage of 2,45 V. Thus, if the first and the second supercapacitor cells are connected to each other, the jointly provided backup supply voltage equals 4,9 V. Preferably, at least two, two, three or four supercapacitor cells are connected in series forming the supercapacitor group.

The object is further solved by a motor vehicle comprising an electronically controlled door latch as described before and the main power source, whereby the main power source is connected to the system basis chip. Thus, during the normal operating condition, the main power source operates for the system basic chip and/or the electric motor for actuating the electric motor for, for example, locking and unlocking a door of the motor vehicle.

The object is even further solved by a method for operating an electronically controlled door latch of a motor vehicle, the electronically controlled door latch being configured for operating in at least three different operation conditions including a normal operating condition, a sleep operating condition and a crash operating condition, and the electronically controlled door latch comprising
- a system basis chip configured for receiving a main supply voltage from a main power source of the motor vehicle during the normal operating condition and a backup supply voltage during the crash operating condition, and
- an electric motor configured for actuating the electronically controlled door latch based on the main supply voltage during the normal operating condition and on the backup supply voltage during the crash operating condition, and comprising the step of:
- the system basis chip triggering an electronic control unit for falling asleep during the sleep operating condition and for being wakening up during the normal operating condition and the crash operating condition, whereby the electronic control unit is configured for controlling the electric motor during the normal operating condition and during the crash operating condition.

Further implementations and advantages of the method for operating an electronically controlled door latch can be derived by the person skilled in the art from the electronically controlled door latch as described above.

BRIEF DESCRIPTION OF DRAWINGS

These and other aspects of the invention will be apparent from and elucidated with reference to the implementation described hereinafter.

In the drawings:

FIG. 1 shows a schematic circuit diagram of an only schematically depicted electronically controlled door latch for an only schematically depicted motor vehicle according to a preferred implementation of the invention.

DESCRIPTION OF IMPLEMENTATIONS

FIG. 1 shows a schematic circuit diagram of an only schematically depicted electronically controlled door latch 1 for an only schematically depicted motor vehicle 2. The motor vehicle 2 includes for side doors, not shown, which are each equipped with one electronically controlled door latch 1. Besides that the electronically controlled door latch 1 can be associated to rear hatches, bonnet lid or other closed compartments, window regulators, sunroofs, in addition to the side doors of such motor vehicle 2.

The electronically controlled door latch 1 comprises a housing made of plastic, metal or a combination thereof. The housing houses arranged therein a system basis chip 3, an electric motor 4, and electronic control unit 5. During a normal operating condition the system basis chip 3 is supplied with a main supply voltage Vbatt of 12 V DC from a main power source 6 of the motor vehicle 2.

When the main supply voltage Vbatt is not available anymore, for example when the motor vehicle 2 had an accident that led to a separation of the main power source 6, the system basis chip 3 is fed during such crash operation condition by a backup supply voltage Vsc provided by a supercapacitor group 7 arranged within the electronically controlled door latch 1. The supercapacitor group 7 therefore stores energy during the normal operating condition for providing the backup supply voltage Vsc during the crash operating condition. Such wise the electric motor 4 actuates the electronically controlled door latch 1 based on the main supply voltage Vbatt during said normal operating condition and based on the backup supply voltage Vsc during the crash operating condition.

The system basis chip 3 is connected to the electronic control unit 5 for respectively triggering the electronic control unit 5 for falling asleep during a sleep operating condition. Falling asleep means in particular that the electronic control unit 5 is powered off for saving energy. Specifically, the electronic control unit 5, when being triggered by the system basis chip 3, falls asleep during the sleep operating condition and, when again being triggered by the system basis chip 3, wakens up during the normal operating condition and during the crash operating condition. During the normal operating condition and during the crash operating condition the electronic control unit 5 controls the electric motor 4 for respectively actuating the doors.

The system basis chip 3 comprises a low-dropout, LDO, regulator 8, which receives the main supply voltage Vbatt and the backup supply voltage Vsc, a wakeup manager 9 configured for receiving a wakening up signal 10 and a bus transceiver 11 for communicating with the motor vehicle 2 via a field bus 12 exchanging information with other control units of the motor vehicle 2. When the system basis chip 3 gets an awake trigger, then the system basis chip 3 powers on the electronic control unit 5. Specifically, control is taken by powering on/off the LDO regulator 8.

Such wise the electronically controlled door latch 1 is configured for operating in the at least three different operation conditions including the normal operating condition, the sleep operating condition and the crash operating condition. During the sleep operating condition the electronic control unit 5 has a significantly reduced power consumption and monitors only wakeup-signal received from the system basis chip 3. Further, during said sleep operating condition the system basis chip 3 also powers off the LDO regulator 8 and the bus transceiver 11 for further reducing energy consumption of the electronically controlled door latch 1.

Once the electronic control unit 5 has been woken up by the system basis chip 3, a wakening up signal 10 received by the system basis chip 3 during the electronic control unit 5 was fallen asleep, is processed as wakening up request by the electronic control unit 5. The system basis chip 3 wakes up the electronic control unit 5 in response to an i/o status signal change, a bus transition at the field bus 12 and/or a change from the normal operating condition to the crash operating condition. Further, internal sensors such as hall-effect sensors can be present as wakeup sources.

As outlined before, the supercapacitor group 7 is configured to store energy during the normal operating condition and to provide the backup supply voltage Vsc during the crash operating condition. The supercapacitor group 7 therefore comprises a first and a second supercapacitor cells 13 connected in series, with the first supercapacitor cell 13 connected with its negative pole to ground. Each supercapacitor cell 13 delivers, when fully charged, a voltage of 2,45 V DC i.e. the supercapacitor group 7 delivers a backup supply voltage Vsc of 4,9 V DC. Besides that more than two supercapacitors cells 13 can be connected in series and such wise delivering a higher backup supply voltage Vsc.

While the invention has been illustrated and described in detail in the drawings and foregoing description, such illustration and description are to be considered illustrative or exemplary and not restrictive; the invention is not limited to the disclosed implementations. Other variations to be disclosed implementations can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE NUMERALS 1 electronically controlled door latch
2 motor vehicle
3 system basis chip
4 electric motor
5 electronic control unit
6 main power source
7 supercapacitor group
8 low-dropout, LDO, regulator
9 wakeup manager
10 wakening up signal
11 bus transceiver
12 field bus
13 supercapacitor cell
Vbatt main supply voltage
Vsc backup supply voltage

What is claimed is:

1. An electronically controlled door latch for a motor vehicle, the electronically controlled door latch being configured for operating in at least three different operation conditions including a normal operating condition, a sleep operating condition and a crash operating condition, the electronically controlled door latch comprising:
a system basis chip configured for receiving a main supply voltage from a main power source of the motor vehicle during the normal operating condition and a backup supply voltage during the crash operating condition,
an electric motor configured for actuating the electronically controlled door latch based on the main supply voltage during the normal operating condition and on the backup supply voltage during the crash operating condition, and
an electronic control unit configured for controlling the electric motor during the normal operating condition and during the crash operating condition,
wherein the electronic control unit is configured to determine a change from the normal operating condition to the crash operating condition when the main supply voltage is below a threshold value,
wherein in at least the crash operating condition, the system basis chip is further configured to cause the electronic control unit to fall asleep by powering off, and
wherein responsive to receiving a wakening up signal, the system basis chip is configured to awaken the electronic control unit by providing power to the electronic control unit via the backup supply voltage.

2. The electronically controlled door latch according to claim 1, whereby the system basis chip comprises a low-dropout, LDO, regulator configured for receiving the main supply voltage and the backup supply voltage, a wakeup manager configured for receiving a wakening up signal and a bus transceiver configured for communicating with the motor vehicle.

3. The electronically controlled door latch according to claim 2, whereby the system basis chip is further configured, to power off the LDO regulator and/or the bus transceiver when the system basis chip power offs the electronic control unit.

4. The electronically controlled door latch according to claim 1, whereby the system basis chip comprises a low-dropout, LDO, regulator and/or a wakeup manager configured for awakening the electronic control unit by powering on the electronic control unit in response to the wakening up signal.

5. The electronically controlled door latch according to claim 4, whereby the electronic control unit is configured for processing a wakening up request associated with the wakening up signal.

6. The electronically controlled door latch according to claim 1, whereby the system basis chip is configured to awaken the electronic control unit by powering on the electronic control unit in response to an i/o status signal change, a bus transition and/or a change from the normal operating condition to the crash operating condition.

7. The electronically controlled door latch according to claim 1, comprising a supercapacitor group configured to store energy during the normal operating condition and to provide the backup supply voltage during the crash operating condition.

8. The electronically controlled door latch according to claim 7, whereby the supercapacitor group comprises at least a first supercapacitor cell, at least a first and a second supercapacitor cells, connected to each other, to jointly provide the backup supply voltage.

9. A motor vehicle comprising an electronically controlled door latch according to claim 1 and the main power source, whereby the main power source is connected to the system basis chip.

10. A method for operating an electronically controlled door latch of a motor vehicle, the electronically controlled door latch being configured for operating in at least three different operation conditions including a normal operating condition, a sleep operating condition and a crash operating condition, and the electronically controlled door latch comprising
a system basis chip configured for receiving a main supply voltage from a main power source of the motor vehicle during the normal operating condition and a backup supply voltage during the crash operating condition, and an electric motor configured for actuating the electronically controlled door latch based on the main supply voltage during the normal operating condition and on the backup supply voltage during the crash operating condition, the method comprising the step of:

triggering an electronic control unit for falling asleep via the system basis chip by powering off the electronic control unit during at least the crash operating condition and responsive to the system basis chip receiving a wakening up signal, causing the electronic control unit to awaken by powering on and providing power to the electronic control unit via the backup supply voltage, whereby the electronic control unit is configured for controlling the electric motor during the crash operating condition.

* * * * *